March 31, 1953 F. C. CAPLES 2,633,318
UTENSIL SUPPORT FOR CAMPFIRES
Filed May 13, 1949 2 SHEETS—SHEET 2
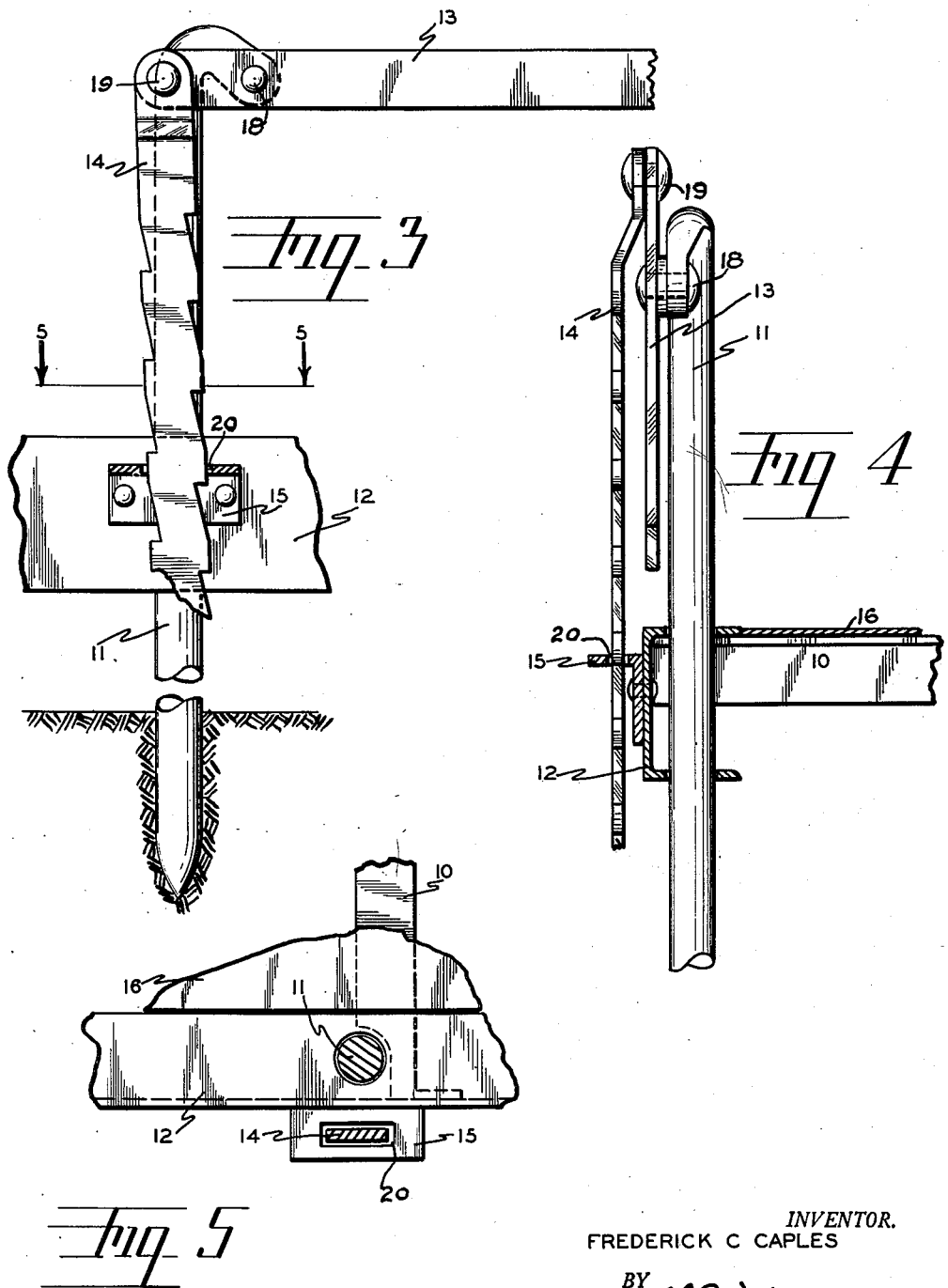
INVENTOR.
FREDERICK C CAPLES
BY
ATTORNEY Patented Mar. 31, 1953

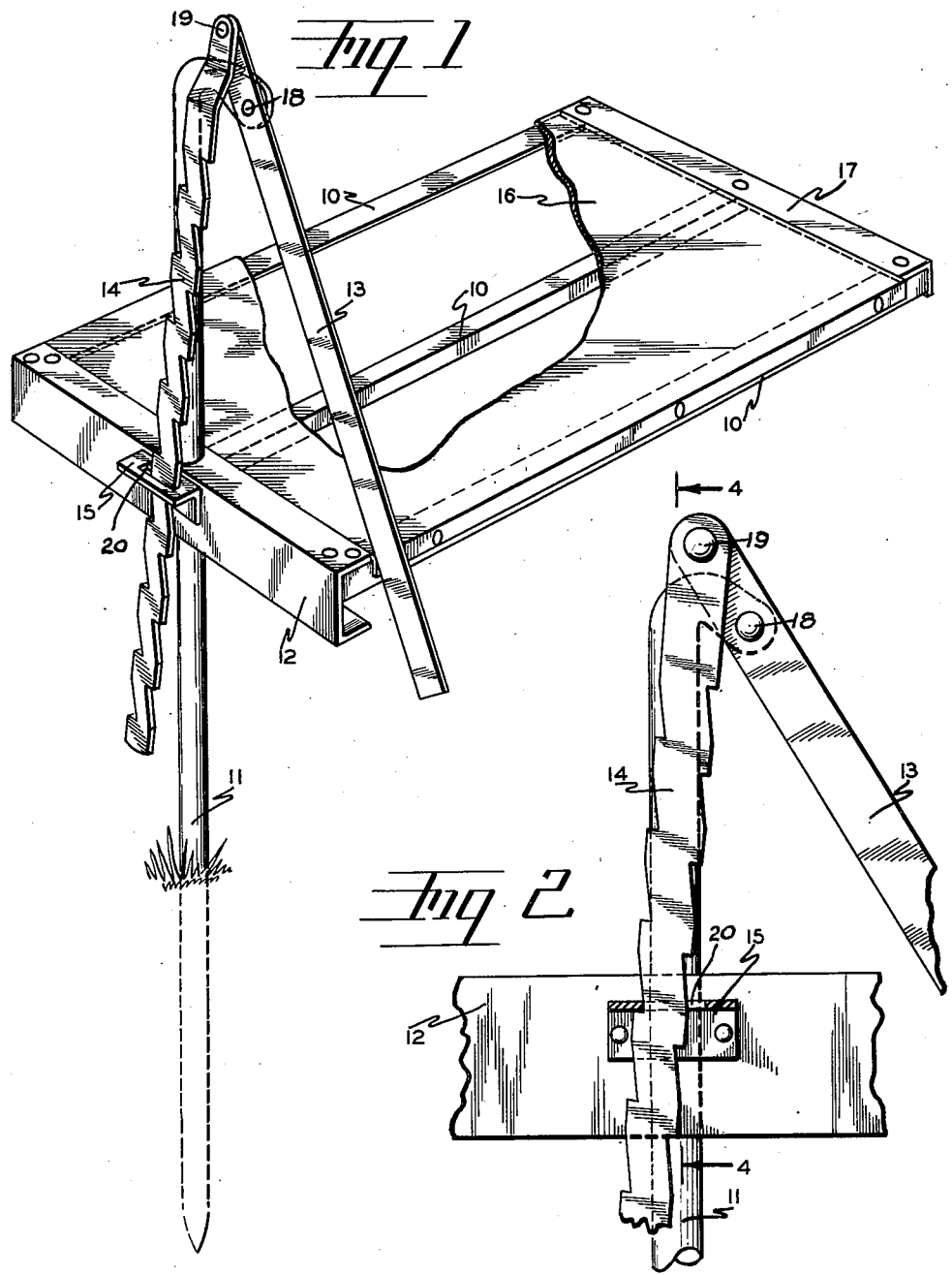

2,633,318

UNITED STATES PATENT OFFICE 2,633,318

UTENSIL SUPPORT FOR CAMPFIRES

Frederick C. Caples, Columbia City, Oreg.

Application May 13, 1949, Serial No. 93,207

2 Claims. (Cl. 248—125)

This invention relates in general to devices used for supporting cooking utensils over an open fire, and, more particularly, relates to a frame and cooking surface adapted to be removably positioned over a camp fire so as to provide a utensil support and a cooking surface on which the cooking can conveniently be performed.

One of the objects of this invention is to provide an improved cooking utensil support for camp fires which can easily and quickly be set up in any location and which can just as easily be disassembled and conveniently packed up.

Another object of this invention is to provide an improved cooking support mounted on a single standard adapted to be driven into the ground and so arranged that the cooking support may be readily swung away from the fire, as well as over the fire, without any inconvenience or danger of burning the person engaged in the cooking.

A further object of this invention is to provide an adjustable cooking support which can be raised or lowered during the cooking operation to meet the particular cooking requirements or to make most efficient use of the open fire, without any danger or inconvenience to the person engaged in the cooking.

An additional object is to provide a cooking utensil support of the character above indicated which will be simple in construction and easy and inexpensive to manufacture so that it can be made available at a relatively low price to the public.

The manner in which these objects and other advantages are attained with my improved cooking utensil support will be apparent from the following brief description of the same with reference to the accompanying drawings.

In the drawings:

Fig. 1 is a perspective view of my entire cooking utensil support showing the same set up for use;

Fig. 2 is a fragmentary end elevation of the same illustrating the manner in which the cooking surface may be raised whenever desired during the cooking operation;

Fig. 3 is a similar fragmentary end elevation showing the cooking surface raising and lowering means in neutral position and illustrating the manner in which the cooking surface can be swung into position over the fire or away from the fire;

Fig. 4 is a fragmentary vertical section on line 4—4 of Fig. 2; and

Fig. 5 is a fragmentary plan section on line 5—5 of Fig. 3.

Referring first to Fig. 1, a rectangular cooking support frame, of any desired and convenient size, is formed of spaced longitudinal metal members, such as the angle iron members 10, having their ends secured to end frame members such as the angle iron 17 and the channel-shaped member 12. The channel member 12 is of larger size and extends down below the underside of the frame. The reason for this will appear later. A metal sheet 16 is secured in place over the top of the frame as shown, in order to provide a suitable flat cooking surface. While the metal sheet 16 may be of any thickness desired, I prefer to have the same of relatively thin metal so that it will heat through quickly and will also cool quickly when no longer needed, and also so that the entire device will be of convenient light weight for carrying.

The frame with its metal sheet covering is mounted on a standard 11 which consists of a single metal rod, the bottom end of which is preferably pointed and adapted to be driven into the ground a sufficient distance so as to enable the rod to stand upright firmly and support the combined weight of the frame and the cooking utensils, etc., supported on the cooking surface. The rod or standard 11 should of course be of sufficient diameter or stiffness to enable the rod to support the weight imposed without any bending of the rod and it should be of sufficient length to permit the cooking surface to be positioned at any desired height with respect to the ground and open fire. This will of course depend considerably upon the type of fire and the nature of the fuel used, but for most camp fires and most occasions a length of approximately three feet for the rod or standard 11 will be found sufficient. Similarly, I have found that a convenient and adequate size for the cooking frame is a width of one to two feet and a length of three feet corresponding to the length of the rod or standard 11. This size is suitable for average camp fire cooking requirements, but of course the size may be varied and even the shape of the frame could be changed if desired.

A pair of vertically alined holes, of a diameter slightly larger than that of the rod or standard 11, is provided at the center of the top and bottom flanges of the end channel member 12 of the cooking surface frame, and when my device is to be set up the rod or standard 11 is inserted through this pair of holes in the member 12. When the rod 11 is set in vertical position, and consequently with the cooking surface frame substantially in horizontal position, the frictional engagement of the rod 11 with the adjacent portions of the top and bottom flanges of the member 12 about the holes, will suffice to hold the frame, and the cooking utensils placed thereon, at any elevation to which the frame is positioned on the rod or standard.

In order to prevent an excessive leverage strain between the frame and supporting rod 11, it is desirable to have the channel member 12 made of larger size than the other frame members so that the top and bottom flanges will be spaced sufficiently apart, and the channel member 12 sufficiently strong, to avoid any excessive leverage strain. For example, with a frame of the preferred size, previously indicated, I have found that a channel member 12 having the central web from two to two and one-half inches wide is very satisfactory, while the remaining frame members need have their vertical flanges only approximately one-half that width.

The top end of the rod 11 is flattened and formed into a downwardly extending curve. A pin or bolt 18, securely mounted in the curved end of the rod 11, serves as a pivotal support for a control handle 13, a spacer sleeve being mounted on the pin or bolt 18 between the rod 11 and the control handle 13. A double edged ratchet bar 14 has its upper end pivotally connected to the adjacent end of the control handle 13 by means of the pin or bolt 19. Thus the control handle 13 is in effect a lever arm which is fulcrumed at 18 and capable of exerting leverage to move the ratchet bar 14 up or down for a restricted distance.

As clearly shown in Figs. 1, 2 and 3, the ratchet bar 14 has both of its lateral edges formed into similar sets of ratchet teeth, the teeth on one side, however, extend in the opposite direction from those on the other side. Preferably, although not necessarily, the ratchet teeth of the set on one side are positioned in staggered relationship with respect to the set of teeth on the other side.

An engageable bracket 15, which may conveniently be made from a short section of angle iron as illustrated, is secured on the outer face of the channel frame member 12 approximately at the center of the member 12. The top or horizontal flange of the bracket 15 is provided with a slot 20, the length of which is greater than the overall width of the ratchet bar 14, and the width of which is slightly greater than the thickness of the ratchet bar 14. Thus the ratchet bar 14 can be made to slide freely up and down in the slot 20, or, when desired, either set of ratchet teeth on the ratchet bar can be caused to engage the corresponding end of the slot 20 by pushing the ratchet bar a short distance towards one end of the slot or the other.

When my device is being set up and the rod 11 is inserted through the aligned holes in the top and bottom flanges of the member 12, as previously mentioned, the ratchet bar 14 is inserted in the slot 20, and, by keeping the two sets of ratchet teeth out of engagement with the adjacent ends of the slot, the cooking surface frame can be moved to any desired initial position on the rod 11.

After my device has been set up over the fire, as illustrated in Fig. 1, if the person engaged in the cooking desires to have the cooking surface raised to a slightly higher height above the fire, the bottom end of the ratchet bar 14 is pushed over (towards the left as viewed in Fig. 2), so that the ratchet and edge of the ratchet bar will engage the corresponding end of the slot 20. Then, as long as the ratchet bar is kept in engagement with that end of the slot, manipulation of the control handle 13 up and down will operate to raise the frame on the rod 11. This raising of the frame and cooking support takes place without any disturbance of the rod 11 and without the necessity of touching the cooking surface or frame or of removing any of the cooking utensils therefrom.

Now, let it be assumed that the person engaged in the cooking desires to lower the cooking surface so as to bring it down closer to the fire, as, for example, when the fire has burned down. The lowering of the cooking surface is performed in a similar manner. The bottom end of the ratchet bar 14 is now pushed over to cause the edge of the ratchet bar, thus the right hand edge as viewed in Fig. 2 to engage the corresponding end of the slot 20. With the ratchet bar 14 in this engaging position it is apparent from Fig. 2 that movement of the control handle 13 up and down will now operate to position the frame and cooking surface down lower on the rod or standard 11.

At any time during the cooking, or after the cooking is finished, the frame and cooking surface with the utensils supported thereon, can easily be swung away from the fire merely by raising the control handle 13 and using this handle to turn the rod 11 and thereby cause the entire assembly to be rotated. Thus by temporarily swinging the frame away from its position over the fire, the fire can be replenished with fuel more conveniently and without interference, whereupon the frame can then be swung back over the fire. When the cooking is finished the swinging of the frame away from the fire provides a suitable rest for the utensils in which the cooking has been done and thus dispenses with the necessity of removing the utensils one by one and setting them on the ground or in some other unsatisfactory position.

As will be obvious, the dismantling of my device is done as quickly and as easily as the setting up of the device. When the frame and cooking surface have cooled, the frame is lowered to the ground on the rod 11 and the rod 11 is then pulled up out of the ground, whereupon the rod 11 with the connected control handle 13 and ratchet bar 14 can be packed away with the frame and cooking surface.

Minor modifications could of course be made in the construction of my device without departing from the principle of my invention. Thus the frame of the cooking surface could be differently constructed. It could be made in the form of an open grill if desired and the sheet metal covering omitted. However I consider the sheet metal covering to be preferred since this keeps the cooking utensils from being blackened by the fire and the reduction of the number of structural members in the frame reduces the total weight of the frame, which is an important consideration if the device is to be carried for any distance. Consequently I consider that the preferred form for the carrying out of my invention is substantially that as I have illustrated in the drawings, although it is not my intention to limit my invention otherwise than as set forth in the claims.

I claim:

1. A camp fire cooking utensil support including a standard adapted to be set up in the ground in substantially vertical position adjacent the camp fire, a cooking utensil supporting frame, said frame having an end portion of substantial thickness from top to bottom, an opening extending through the center of said end portion from top to bottom corresponding approximately to the cross section of said standard, whereby said standard can be inserted through said opening and, when said standard is set up in the ground, said frame will be slidable on said standard and will be supported substantially in horizontal position by said standard, a ratchet bar having oppositely arranged sets of ratchet teeth on opposite sides of said ratchet bar respectively, a control lever handle fulcrumed on the top of said standard, said ratchet bar pivotally connected to said handle a short distance from said fulcrum point, a rectangular slot in said frame near the opening through which said standard passes through said frame, said ratchet bar extending through said slot, the length of said slot being greater than the width of said ratchet bar and thus greater than the distance between said opposite sets of teeth, whereby a slight swing of said ratchet bar will enable either set of ratchet teeth to be brought into engagement with the respective end of said slot, whereby said lever handle can be used either for rotating said standard and frame, or, in conjunction with, and upon adjustment of, said ratchet bar, for raising or lowering said frame.

2. A camp fire cooking utensil support comprising a rod adapted to be set up in the ground in substantially vertical position adjacent the camp fire, a composite cooking utensil supporting frame, a relatively large channel member forming one end of said frame, a pair of centrally-positioned, vertically-aligned holes in the top and bottom flanges of said channel member of substantially the same diameter as said rod, whereby said rod can be inserted through said holes and, when said rod is set up in the ground, said channel member and therewith said frame will be slidable on said rod and will be supported substantially in horizontal position by said rod, a ratchet bar having oppositely arranged sets of ratchet teeth on opposite sides of said ratchet bar respectively, the teeth of one set being in staggered relationship with those of the other, a short curved end at the top of said rod, a control lever handle fulcrumed on said end for up and down movement, said ratchet bar pivotally connected to said handle, a member extending horizontally from the rear portion of said frame, a slot in said member, said ratchet bar extending through said slot, the length of said slot being greater than the width of said ratchet bar and thus greater than the distance between said opposite sets of teeth, whereby a slight swing of said ratchet bar will enable either set of ratchet teeth to be brought into engagement with the respective end of said slot, whereby said lever handle can be used either for rotating said rod and frame, or, in conjunction with, and upon adjustment of said ratchet bar, for raising or lowering said frame.

FREDERICK C. CAPLES.

REFERENCES CITED

The following references are of record in the file of this patent:

UNITED STATES PATENTS

| Number | Name | Date |
| --- | --- | --- |
| 670,144 | Bond | Mar. 19, 1901 |
| 704,603 | Wadsworth | July 15, 1902 |
| 758,015 | Miller | Apr. 19, 1904 |
| 1,666,293 | Lorton | Apr. 17, 1928 |
| 2,173,024 | Park | Sept. 12, 1939 |